(12) United States Patent
Jacobs et al.

(10) Patent No.: US 11,619,587 B2
(45) Date of Patent: Apr. 4, 2023

(54) LATERAL DETECTION OF FLUID PROPERTIES

(71) Applicant: PHARMAFLUIDICS NV, Ghent (BE)

(72) Inventors: Paul Jacobs, Lokeren (BE); Wim De Malsche, Berchem (BE)

(73) Assignee: PHARMAFLUIDICS NV, Ghent (BE)

( * ) Notice: Subject to any disclaimer, the term of this patent is extended or adjusted under 35 U.S.C. 154(b) by 0 days.

(21) Appl. No.: 16/608,443

(22) PCT Filed: Apr. 27, 2018

(86) PCT No.: PCT/EP2018/060979
§ 371 (c)(1),
(2) Date: Oct. 25, 2019

(87) PCT Pub. No.: WO2018/197712
PCT Pub. Date: Nov. 1, 2018

(65) Prior Publication Data
US 2021/0072154 A1   Mar. 11, 2021

(30) Foreign Application Priority Data
Apr. 27, 2017 (EP) ..................... 17168557

(51) Int. Cl.
*G01N 21/64* (2006.01)
*G01N 21/05* (2006.01)
*G01N 27/02* (2006.01)

(52) U.S. Cl.
CPC ........... *G01N 21/648* (2013.01); *G01N 21/05* (2013.01); *G01N 27/02* (2013.01); *G01N 2201/08* (2013.01)

(58) Field of Classification Search
CPC ...... G01N 21/648; G01N 27/02; G01N 21/05; G01N 2201/08
See application file for complete search history.

(56) References Cited

U.S. PATENT DOCUMENTS

| 9,089,843 | B2 | 7/2015 | Kim et al. |
| 10,451,540 | B2 | 10/2019 | Baum et al. |

(Continued)

FOREIGN PATENT DOCUMENTS

| CN | 102062729 A | 5/2011 |
| CN | 105102113 A | 11/2015 |

(Continued)

OTHER PUBLICATIONS

European Search Report from EP Application No. EP17168557, dated Oct. 12, 2017.

(Continued)

*Primary Examiner* — Kiho Kim
(74) *Attorney, Agent, or Firm* — Workman Nydegger (57) ABSTRACT

A microfluidic device comprises a microfluidic channel having at least an inlet for receiving a fluid plug or an outlet for removing a fluid plug and a pillar based flow distributor for reorienting the fluid plug in such a way that the long axis of the fluid plug essentially is oriented perpendicular to the walls of the microfluidic channel, as opposed to its original orientation, in which the longer axis is oriented in the longitudinal direction of the narrower inlet channel. The width W of the microfluidic channel is substantially larger than the width w of the inlet or outlet channel. The microfluidic device is adapted for detecting a physical or chemical property of the fluid, the microfluidic device being configured for detecting the property in a detection area positioned across the microfluidic channel in a width direction of the microfluidic channel.

20 Claims, 6 Drawing Sheets

(56) References Cited

U.S. PATENT DOCUMENTS

| | | | |
|---|---|---|---|
| 2002/0110839 A1* | 8/2002 | Bach | B82Y 5/00 |
| | | | 435/7.9 |
| 2002/0180963 A1 | 12/2002 | Chien et al. | |
| 2004/0165186 A1* | 8/2004 | Bjornson | G01N 21/645 |
| | | | 356/436 |
| 2005/0095602 A1 | 5/2005 | West et al. | |
| 2007/0009382 A1* | 1/2007 | Bedingham | G01N 21/645 |
| | | | 422/63 |
| 2009/0051901 A1* | 2/2009 | Shen et al. | B82Y 5/00 |
| | | | 435/7.9 |
| 2009/0323069 A1 | 12/2009 | Naessens et al. | |
| 2012/0084022 A1 | 4/2012 | Giovangrandi et al. | |
| 2012/0261356 A1 | 10/2012 | Tsutsui | |
| 2013/0028812 A1* | 1/2013 | Prieto | B01J 13/04 |
| | | | 422/502 |
| 2013/0079248 A1 | 3/2013 | Kim et al. | |
| 2016/0001199 A1* | 1/2016 | De Malsche | B01J 20/28014 |
| | | | 210/198.2 |
| 2018/0011003 A1 | 1/2018 | Baum et al. | |

FOREIGN PATENT DOCUMENTS

| | | |
|---|---|---|
| CN | 105301174 A | 2/2016 |
| CN | 107250764 A | 10/2017 |
| EP | 1881318 A1 | 1/2008 |
| EP | 2573540 A1 | 3/2013 |
| EP | 2953716 A1 | 12/2015 |
| JP | 2002221485 A | 8/2002 |
| JP | 2006300726 A | 11/2006 |
| JP | 2007113979 A1 | 5/2007 |
| JP | 2007248253 A | 9/2007 |
| JP | 2009031375 A1 | 2/2009 |
| JP | 2009063601 A | 3/2009 |
| JP | 2009109232 A | 5/2009 |
| JP | 2009175108 A | 8/2009 |
| JP | 2015001416 A | 1/2015 |
| JP | 2016508440 A | 3/2016 |
| KR | 20130033110 A | 4/2013 |
| WO | 2008142160 A1 | 11/2008 |
| WO | 2017049279 A1 | 3/2017 |

OTHER PUBLICATIONS

International Search Report & Written Opinion from PCT Application No. PCT/EP2018/060979, dated May 28, 2018.
Office Action from corresponding Chinese Application No. 201880027156.5, dated Dec. 3, 2021.
Japanese Office Action and Written Opinion from Corresponding Application No. 2019-558401, dated Mar. 22, 2022.
European Office Action from Corresponding Application No. EP18720617.2, dated Apr. 4, 2022.
Office Action from Chinese Application No. 201880027156.5, dated Nov. 22, 2022.

* cited by examiner

LATERAL DETECTION OF FLUID PROPERTIES

FIELD OF THE INVENTION

The invention relates to a microfluidic device for detecting a characteristic of a fluid. More particularly, the present invention relates to a microfluidic device wherein a distributor and a detector are configured for detecting a fluid property with good sensitivity.

BACKGROUND OF THE INVENTION

Detection of fluid properties is performed in a plurality of applications. In quite some applications, the amount of fluid available for detecting properties is small, which increases the difficulties for obtaining accurate and high-resolution quantification of properties. Often, microfluidic structures are used for performing characterisation of small amounts of fluids. Nevertheless, even for conventional microfluidic structures the amount of fluid available may render accurate characterisation challenging.

Some particular microfluidic structures have been specifically constructed for characterising properties of fluids of which only a small amount is available.

One example thereof is a Z-shaped configuration wherein a microfluidic channel has a Z-shape and wherein the detection is performed by detecting a property in a length direction of the microfluidic channel.

Nevertheless, even if the path length over which detection can be performed can be significantly long for a limited amount of fluid available, existing solutions often correspond with systems wherein the induced backpressure is high.

There consequently still is room for improvement.

SUMMARY OF THE INVENTION

It is an object of embodiments of the present invention to provide a detection system allowing detection of a characteristic of a fluid with good sensitivity. It is an advantage of embodiments of the present invention that a detection system allowing detection of a characteristic with high sensitivity is obtained, even for cases where the available amount of sample is limited.

It is an advantage according to embodiments according to the present invention that a detection system is provided allowing measuring over a long path length, while limiting the pressure drop occurring in the system.

The above objective is accomplished by a method and device according to the present invention.

In a first aspect embodiments of the present invention relates to a microfluidic device for detecting a characteristic of a fluid, the microfluidic device comprising
a microfluidic channel having an inlet for receiving a fluid plug respectively an outlet for removing a fluid plug, a pillar based flow distributor for reorienting the fluid plug in such a way that the long axis of the fluid plug essentially is oriented perpendicular to the walls (e.g. upstanding side walls) of the microfluidic channel (i.e. in the transverse orientation), as opposed to its original orientation, in which the longer axis is oriented in the longitudinal direction of the narrower inlet channel, the width W of the microfluidic channel being substantially larger than the width w of the inlet or outlet channel,
wherein the microfluidic device is adapted for detecting with at least one detector a physical or chemical property of the fluid, the microfluidic device being configured for detecting the property in a detection area positioned across the microfluidic channel in a width direction of the microfluidic channel and the microfluidic device being configured for having a detection area positioned within a distance D of an exit respectively entrance of the pillar based flow distributor, the distance D being smaller than the width W of the microfluidic channel.

It is especially advantageous that a pillar-based flow distributor, comprising a plurality of pillars, may reduce distortion of the proceeding and/or receding front of the fluid plug.

It is an advantage of embodiments of the present invention that the system can detect properties of a fluid plug with a very small volume with higher sensitivity, allowing study of small volume samples. The latter is obtained by the detection region being oriented in a width direction of the microfluidic channel.

The aspect ratio of the length of the microfluidic channel, between input and output, to the maximum width of the microfluidic channel may be one or larger. The overall length of the portion of the microfluidic channel having the width W may be larger than the width W of the microfluidic channel.

The flow distributor may be positioned in some embodiments at the entrance of the microfluidic channel.

In some embodiments, the flow distributor may be positioned at the exit of the microfluidic channel. In embodiments according to the present invention, in the microfluidic channel a plurality of pillars, e.g. an array of ordered pillars, advantageously may be introduced. It is especially advantageous in case of detection near a distributor at the exit, that such a plurality of pillars may reduce distortion of the surface shape of the fluid plug.

In yet some other embodiments, a flow distributor may be positioned both at the entrance and at the exit of the microfluidic channel. The detector may be common to both the flow distributor at the entrance and at the exit or, if longer channels are used, a detector may be positioned near the flow distributor at the entrance, near the flow distributor at the exit or at both positions.

It is an advantage of embodiments of the present invention that more accurate detection of fluid properties can be obtained since detection is done for different parts of the fluid sample being in the same state, whereas when measurements are done along the length of the microfluidic channel the obtained results are averaged over different parts of the fluid sample being in a different state.

It is an advantage of embodiments of the present invention that the linear velocity of the fluid plug at the location of the detector is substantially lower than the linear velocity in the inlet- and outlet channels, allowing more efficient interaction with local features that might facilitate, enhance or amplify the detection.

It is an advantage of embodiments of the present invention that the detection systems with high resolution, i.e. whereby the path length through the sample is sufficiently long, can more easily be fabricated than existing detection systems wherein a long path length is obtained, such as for example prior art systems wherein measurements are performed in a U-shaped channel or prior art systems wherein measurements are performed in a Z-shaped channel.

The width (W) of the microfluidic channel in the detection area may be at least 0.2 mm, preferably 1 mm, preferably at least 10 mm up to a few tens of cm.

It is an advantage of embodiments of the present invention that the detection systems with high resolution, i.e.

whereby the path length through the sample is sufficiently long, and with low volume, i.e. where the widths of the inlet and/or outlet channels, or in- or outlet capillaries, must be kept low, introduce significantly lower backpressures than existing detection systems wherein a long path length is obtained, such as for example prior art systems wherein measurements are performed in a U-shaped channel or prior art systems wherein measurements are performed in a Z-shaped channel. It is an advantage that the backpressure induced in embodiments of the present invention can be at least 10, advantageously at least 100 times less than for existing prior art systems such as systems using a U-shaped channel or Z-shaped channel.

The microfluidic device may be adapted for providing an interaction between the sample and a radiation beam for determining an optical property of the sample. Optical detection can assist in detecting a variety of properties of fluid plugs that can be used for characterizing the fluid plug, such as for example detecting an absorbance or absorbance spectrum, a transmission or transmission spectrum, a reflectance or reflection spectrum, scattering but also Raman spectra, etc. These optical characteristics may be used for qualifying and quantifying components being present in the fluid plug.

The system may comprise collimating means and/or guiding means for limiting the radiation in a confined detection region.

The guiding means may be reflectors or reflecting surfaces for redirecting radiation such that it stays in the confined detection region or absorbers or absorbing surfaces for reducing radiation to occur outside the confined detection region. Such reflecting surfaces may occur at a bottom and upper side of the microfluidic channel in the detection region as well as on pillar structures positioned aside the detection region.

The system may be adapted for coupling in radiation from a radiation source and/or for coupling out radiation towards a detector using optical fibers. Such optical fibers may be coupled to the microfluidic device in a plurality of manners, such as for example using a cleaved surface of the optical fiber, using coupling of the fibers, etc.

The microfluidic device may comprise a radiation source and/or an optical detector.

The microfluidic device may comprise a coupler for coupling an external detector to the microfluidic device so that a signal captured in the detection area can be read by the external detector. It is an advantage of embodiments of the present invention that the microfluidic device may be used as a cartridge that can be used with a detection system comprising the detector. It is an advantage that such cartridges can be used as consumables, can be separated from the detection system for cleaning, etc.

The microfluidic device may comprise a coupler for coupling in a radiation beam from an external optical radiation source.

The radiation source may be an integrated radiation source. The detector may be an integrated detector. It is an advantage of embodiments of the present invention that the system may be easy to use, e.g. without the need for coupling external radiation sources or detectors to the microfluidic device.

The microfluidic device may comprise a waveguide positioned in the microfluidic channel in a substantially width direction of the microfluidic channel, for inducing interaction of radiation travelling in the waveguide and a sample fluid in the microfluidic channel.

The waveguide may be arranged for inducing evanescent wave interaction with the sample fluid in the microfluidic channel.

The microfluidic device may comprise an electrical detector for detecting any of a resistance, an impedance, a capacitance or a current density. The electrical detector may comprise at least one working electrode and at least one counter electrode. The height of the microfluidic channel at the position of the electrical detector may be substantially smaller than on average in the remaining part of the microfluidic channel.

The microfluidic device may comprise a chemical detector.

The present invention also relates to a detection system comprising a microfluidic device as described above. The detection system furthermore may comprise one or more of an integrated radiation source, an integrated detector, a processor for processing detection data and deriving thereof a property of the sample fluid and an output means for outputting a property of the sample fluid. The detection system may be an integrated detection system. Alternatively, the detection system may be configured as a cartridge and a cartridge holder.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 2 shows a top view (2A) and a side view (2B) of a microfluidic device for measuring an optical parameter using an external optical source and an external optical detector according to an embodiment of the present invention.

FIG. 3 shows a top view (3A) and a side view (3B) of a microfluidic device for measuring an optical parameter using optical fibers for incoupling and outcoupling of the radiation, according to an embodiment of the present invention.

FIG. 4 shows a top view (4A), a side view (4B) and an enlarged view (4C) of the electric detector for a microfluidic device for measuring an electrical or electrochemical parameter according to an embodiment of the present invention.

FIG. 5 shows a top view (5A) and a side view (5B) of a microfluidic device for measuring an optical parameter using an embedded waveguide, according to an embodiment of the present invention.

In the different drawings, the same reference signs refer to the same or analogous elements.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments according to the present invention reference is made to 'microfluidic' reference is made to fluidic structures or devices wherein there is at least one channel having at least one dimension being within the interval 1000 µm to 1 µm or smaller, advantageously within the interval 50 µm to 1 µm or smaller.

Where in the current description and claims reference is made to an ordered set, reference is made to a set of elements which are not randomly positioned, but where a specific relationship exists between the distances of the elements to each other.

Where in the current description and claims reference is made to distribution or dispersion, reference is made to the spatial dispersion over an area or volume.

Where in embodiments according to the present invention reference is made to a pillar structure, reference is made to a structure positioned in the channel to influence the fluid flow in the channel. The pillar may be upstanding from the bottom wall. It may have any appropriate form. It may for example have a cross-section of the pillar structure may be for instance diamond-shaped, elliptical, oval, polygonal, butterfly shaped, etc.

In a first aspect, the present invention relates to a microfluidic device for detecting a characteristic of a fluid. Such a characteristic may be an optical property such as for example optical density, absorbance, transmittance, reflectance, scattering behaviour, etc., an electrical property such as for example a resistance, an impedance, a capacitance or a current density, an electrochemical property such as for example the presence of electro-active components that can be reduced or oxidized at a specific potential at a specific electrode or the electrolytic conductance in case of resistivity or conductivity in combination with dielectric properties or a charge distribution and dielectric properties, a chemical property such as the presence of certain substances in the fluid, etc. It may for example also be another physical property such as for example a viscosity, as can for example be detected using surface acoustic waves. The microfluidic device is especially advantageous for samples wherein only a restricted amount of sample is available or wherein the property measured is changing rapidly, since the characterisation can be obtained with high resolution even for small amounts of samples as a long path length is obtained by measuring in a transversal direction (with respect to the average flow direction in the microfluidic channel) i.e. in a width direction of the fluidic channel. It furthermore is advantageous that the system can be easily combined with other characterisation techniques such as mass spectrometry, especially since the fluid output of the microfluidic channel may be used as input for a mass spectrometry system.

One particular advantage of embodiments of the present invention is that the induced backpressure, induced in the microfluidic channel comprising the distributor and the detection area, is limited (i.e. is low) and that it is substantially independent of the path length over which detection can be performed. Increasing the path length over which detection can be performed does not significantly result in an increase of the induced backpressure in the system. The induced backpressure may for example be limited to 20%, advantageously 10%, more advantageously 5% of the initial pressure that can be applied in systems according to embodiments of the present invention. The initial pressure that can be applied may be for example limited by the application or by the mechanical strength of the system.

The system according to embodiments of the present invention comprises a microfluidic channel having an inlet for receiving a fluid plug or an exit for removing a fluid plug. The system furthermore comprises a pillar based flow distributor (which could also be referred to as a combiner in case it is positioned at the outlet of the microfluidic channel) for reorienting the fluid plug in such a way that the long axis of the fluid plug essentially is oriented perpendicular to the walls (e.g. the upstanding side walls) of the microfluidic channel (i.e. in the transverse orientation), as opposed to its original orientation, in which the longer axis is oriented in the longitudinal direction of the narrower inlet channel. The width W of the microfluidic channel thereby is substantially larger than the width w of the inlet or outlet channel. The microfluidic device according to embodiments of the present invention is adapted for detecting with at least one detector a physical (e.g. optical or electrical or mechanical) or chemical (e.g. composition related) property of the fluid. It is configured for detecting the property in a detection area positioned across the microfluidic channel in a width direction of the microfluidic channel. The microfluidic device furthermore is configured for having a detection area positioned within a distance D of an exit of the pillar-based flow distributor being smaller than the width W of the microfluidic channel.

By way of illustration, embodiments of the present invention not being limited, the standard and optional features of a microfluidic device according to an exemplary embodiment of the present invention will be further discussed with reference to FIG. 1a and FIG. 1b.

Figure 1A:
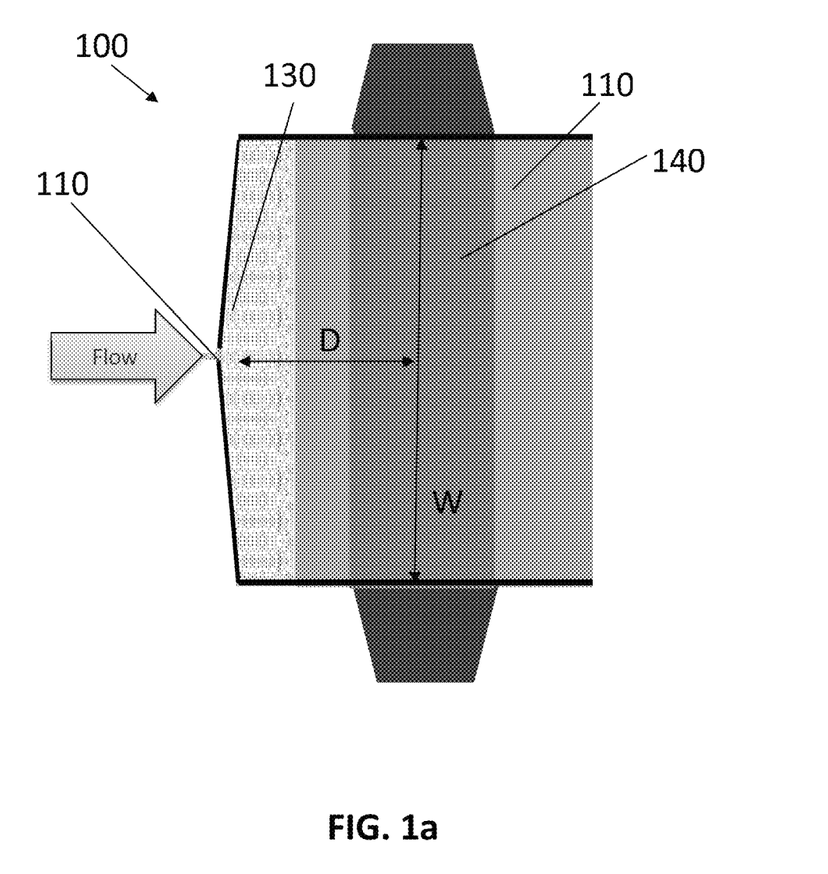
FIG. 1a and FIG. 1b shows a schematic overview of microfluidic devices according to an embodiment of the present invention.
Figure 1B:
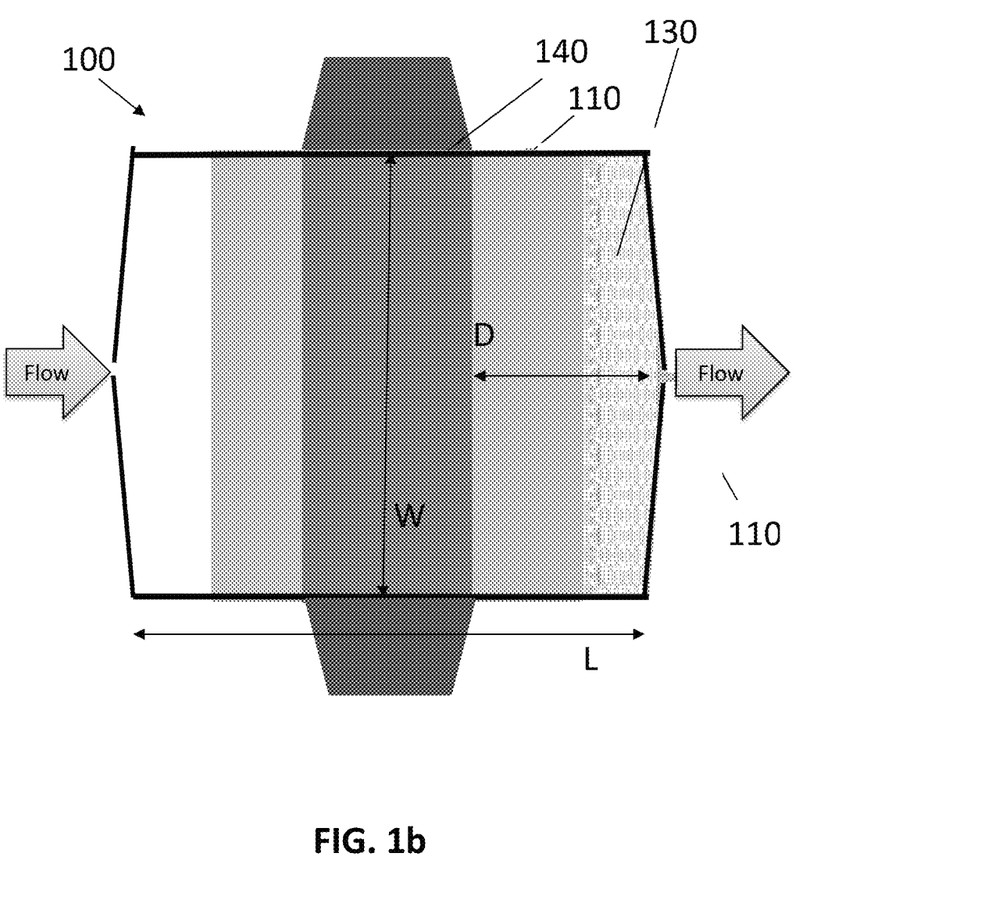

In FIGS. 1a and 1b, a microfluidic device 100 is shown. The microfluidic device 100 comprises a microfluidic channel 110 having an inlet 120 for receiving a fluid plug. The microfluidic channels used may comprise typical features of channels used in microfluidic devices. The typical width of a microfluidic channel used may be in the range 0.2 mm up to a few tens of centimetre, although embodiments are not limited thereto. The useful width of the microfluidic channel will depend on the type of characterisation that is to be performed. For example, a width of 1 mm, which would result in an interaction path length of an optical beam with the sample of 1 mm (in case of optical characterisation) would. Typical UV power sources result in useful measurements for detecting e.g. optical density, under these conditions. The inlet 120 typically has a width that is substantially smaller than the width of the microfluidic channel 110 and in order to increase the width of the fluid plug without introducing turbulence and dispersion, a flow distributor 130 is used. The flow distributor 130 may be any suitable type of flow distributor such as for example a pillar-based flow distributor, although embodiments are not limited thereto. In the pillar-based distributor, the pillars used may be of one or of various types, they may be positioned in an ordered or in a random manner, they may all be made of the same material or may be made of different materials, etc. As indicated above, the flow distributor also may be positioned at the end of the microfluidic channel. An example thereof is shown in FIG. 1b.

According to embodiments of the present invention the microfluidic device 100 is adapted for detecting with at least one detector, which may be internal or external to the microfluidic device, a physical or chemical property of the fluid. In order to be able to detect a property, certain components, which may be considered as part of a detection system associated with the detection of the property, are introduced in the microfluidic device. In case optical detection is performed, collimating means such as collimating slits may be introduced, guiding means such as reflectance or absorbance structures may be introduced, electrodes may be introduced, chemically treated or functionalised surfaces may be introduced, etc. Furthermore, certain components may be provided for reducing or preventing stray light in the system. According to embodiments of the present invention, a detection area 140 positioned across the microfluidic channel 110 in a width direction of the microfluidic channel 110 is used.

The microfluidic device 100 is configured for having the detection area 140 positioned within a distance D of an exit of the pillar-based flow distributor 130 being smaller than the width W of the microfluidic channel.

It is to be noted that although the detection area is shown close to a flow distributor at the entrance of the microfluidic channel, embodiments of the present invention also may use a flow distributor close to the exit of the microfluidic channel or even have a flow distributor at both the entrance and the exit.

By way of illustration, a number of different examples describing different particular embodiments of the present invention are shown below.

In a first particular example, an example is shown wherein an optical parameter such as for example optical density, absorption or transmission can be detected. The microfluidic device according to the first particular example shown comprises a pillar-based flow distributor for spreading the fluid plug from the inlet towards a width W of the microfluidic channel. The device also comprises a region of the microfluidic channel wherein the interaction of the radiation with the sample takes place. This region may be adapted e.g. as separation region, although embodiments are not limited thereto. The particular example also shows a second distributor for reducing the fluid plug from a width W of the microfluidic channel back to a smaller width w of an output channel. It is to be noted that similar embodiments without a second distributor being present can be made.

The radiation source for generating the radiation for detecting the optical parameter may not be part of the microfluidic device. The radiation source may be any suitable optical source emitting radiation in the wavelength region of interest. For example, the radiation source and radiation detector may be any or a combination of a UV, visual, near infrared or infrared radiation source. In some embodiments, the wavelengths used may be in the range 190 nm to 4500 nm, e.g. in the range 190 nm to 1900 nm. The radiation source may for example be a broadband radiation source, a LED, a laser, a VCSEL.

The detector for capturing the radiation for detecting the optical parameter after the radiation has interacted with the sample. The detector may be part or may not be part of the microfluidic device. The detector may be a single dimension intensity detector or may be a two-dimensional detector. The detector may for example be a photodiode or a solid-state detector, an avalanche diode, a photomultiplier or an imaging sensor such as a CMOS imaging sensor. The latter may for example result in a higher resolution and may for example allow for correction for stray light.

The microfluidic device typically may be adapted for guiding the radiation for detecting the optical parameter through the microfluidic channel. The microfluidic device may comprise for example one or more collimating slits for collimating the radiation before it enters the microfluidic channel or when the radiation leaves the microfluidic channel. The microfluidic device also may comprise further radiation guiding means for guiding the radiation in the appropriate direction through the microfluidic channel and for optionally blocking radiation that is or would not be entering the microfluidic channel under the appropriate conditions, i.e. for example under the appropriate angle. In some examples, the collimating slits and/or the further radiation guiding means may be adapted or arranged so that radiation advantageously crosses the microfluidic channel in a direction perpendicular to the average flow direction of the microfluidic channel.

The region of the microfluidic channel wherein the interaction of the radiation with the sample takes place may comprise in certain regions pillar structures and may comprise in a particular region where the radiation actually crosses the microfluidic channel a region wherein no pillar structures are positioned.

In some embodiments, such as for example in the present exemplary embodiment, the region wherein no pillar structures are positioned may be boarded by reflective coatings on the top and/or bottom surface of the microfluidic channel, and or by reflective coatings on the pillars close to the region without pillar structures.

Figure 2A:
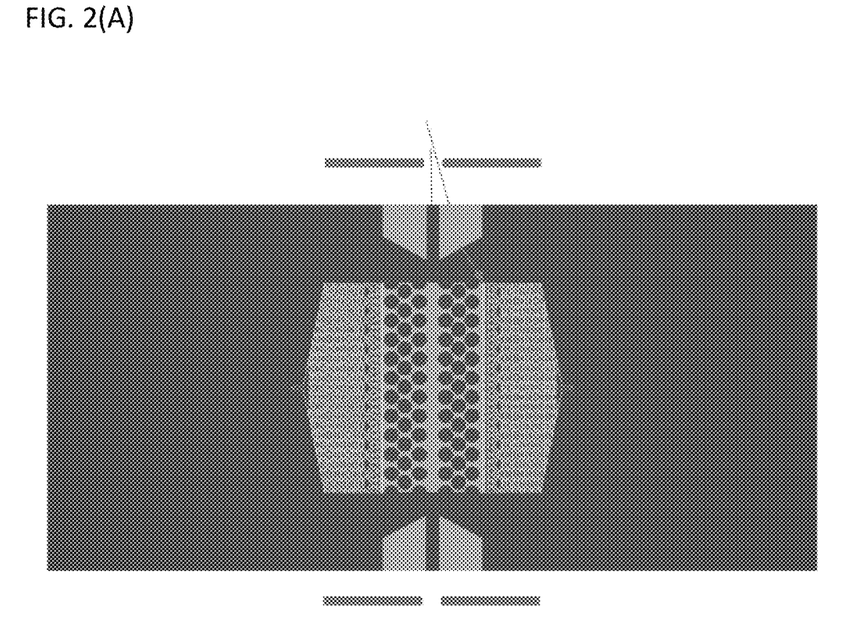
Figure 2B:
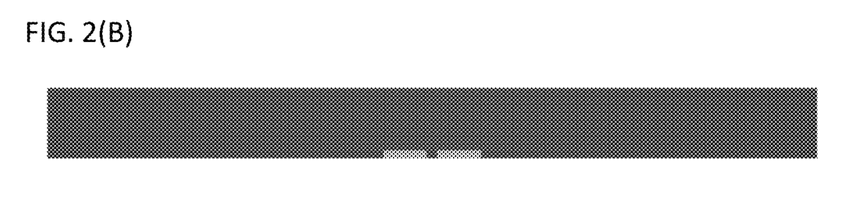

By way of illustration, the particular embodiment not being limited thereto, an example of a microfluidic device is shown in FIG. 2. Both a top view (2A) and a side view (2B) is shown wherein the microfluidic device is shown, comprising two distributors and a region of the microfluidic channel wherein the interaction of the radiation with the sample takes place.

Figure 3A:
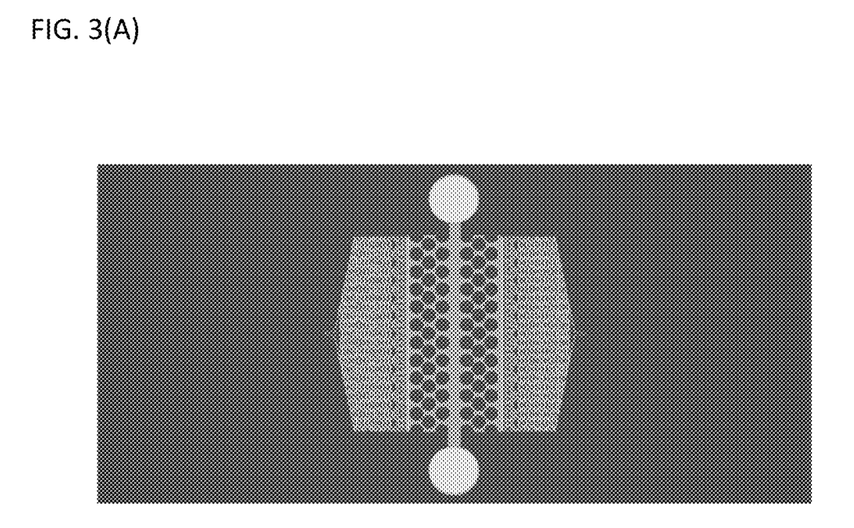
Figure 3B:
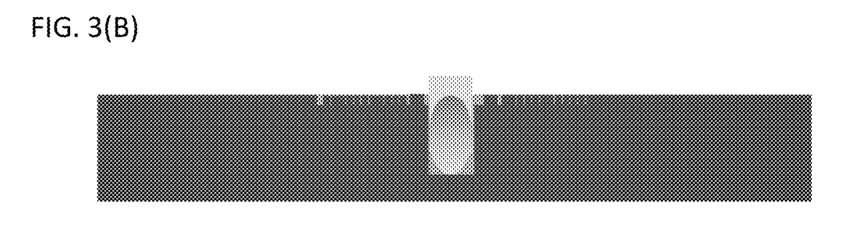

In another particular embodiment, a microfluidic device for characterising an optical parameter of a fluid is described, wherein the radiation for characterising the fluid is introduced in the device using an input optical fiber and wherein the radiation, after interaction with the fluid, is collected using an output optical fiber. The input optical fiber thus connects the microfluidic device with the radiation source and the output optical fiber connects the microfluidic device with the detector. The type of optical fibers that can be used may be any suitable type of optical fibers. The optical fiber may be an angle-cleaved optical fiber, as for example described in U.S. Pat. No. 8,477,298 B2. When using optical fibers, the collimating slits and the means for guiding radiation can optionally be avoided. By way of illustration, an exemplary microfluidic device is shown in FIG. 3, illustrating both a top view (3A) and a side view (3B).

In yet another particular embodiment, a microfluidic device for characterising an electrochemical parameter of a fluid is described. In such an embodiment, the system is adapted for allowing amperometrie. The exemplary microfluidic device comprises two distributors, a first distributor for broadening the sample plug from a first width of the input channel to a second width corresponding with the width of the region where the electric measurement will be performed, and a second distributor for reducing the width of the sample plug from the width of the region where the electric measurement will be performed to a third width, corresponding with the width of the output channel. Similar as for the first and second example, it is to be noted that similar embodiments without a second distributor being present can be made. The central region of the microfluidic device may have a similar lay-out as the lay-out provided for the first exemplary embodiment, but at the position where the electrical characteristic is measured, the height of the microfluidic channel may be reduced. If the height δ of the microfluidic channel at the position where the electrochemical measurements are performed is small, the quality of the measured electrical parameter advantageously increases. The height of the microfluidic channel may for example be between 10 µm and 0.1 µm in the region wherein the height is reduced. The electrodes advantageously can be provided in the top cover of the microfluidic channel. The electrode configuration may for example be such that one working electrode is provided whereby at each side of the working electrode a counter electrode is provided. In some embodiments, a further reference electrode also may be provided. In one embodiment, the electrodes may extend over the full width of the microfluidic channel, such that an average electrical parameter of the fluid is measured. In another embodiment, the working electrode as well as the counter electrode may be provided as an array of electrodes, such that at different positions along the width of the microfluidic channel, different measurements of the electrical parameter can be performed.

Figure 4A:
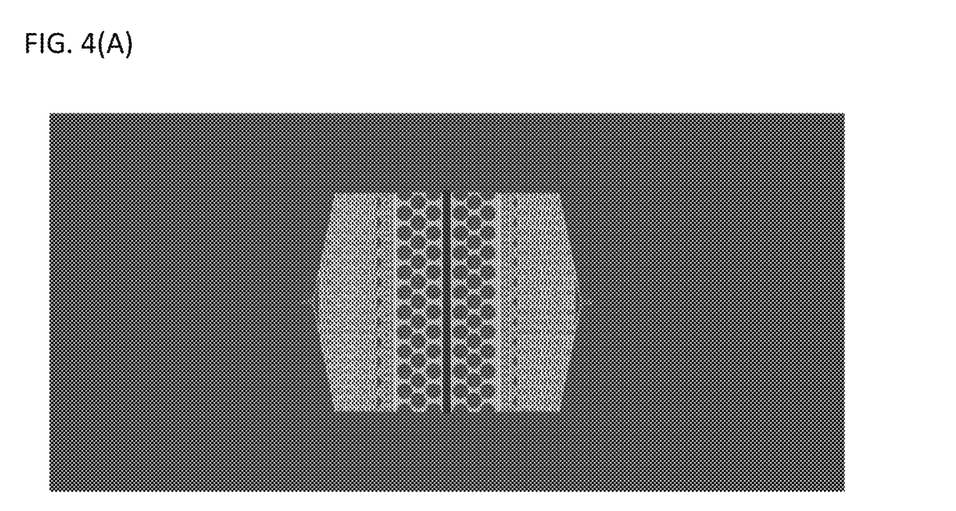
Figure 4B:
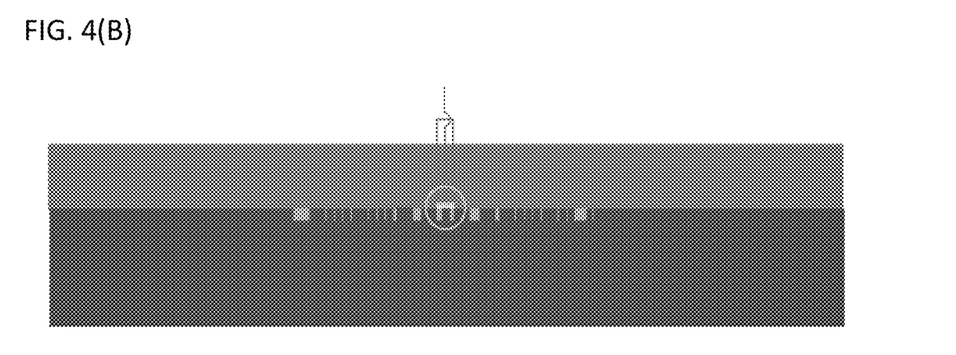
Figure 4C:
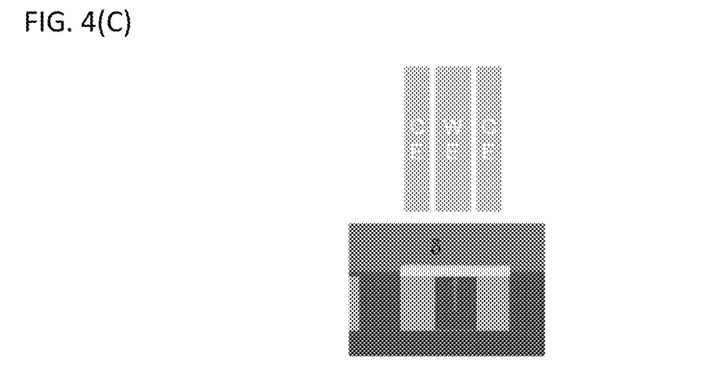

By way of illustration, an exemplary microfluidic device is shown in FIG. 4, illustrating a top view (4A), a side view (4B) and an enlarged side view of the electrode part (4C) with an additional indication on how the electrodes can be implemented.

The system may especially be advantageous in combination with a mass spectrometer.

In a fourth exemplary embodiment, the microfluidic device again may be adapted for optical characterisation of a fluid, but this may be performed using photonics. The radiation may be provided in the microfluidics device via a waveguide embedded in the microfluidic device. The waveguide then typically is oriented in a direction substantially perpendicular to the walls, e.g. the upstanding side walls, of the microchannel. It is an advantage of embodiments of the present invention that the microfluidic device may be made of a material that is compatible with photonics, e.g. the microfluidic device may be made of a silicon-based material.

In some embodiments, the waveguide may be interrupted so that the radiation travelling in the waveguide interacts, at the positions of interruption, with the sample. In other embodiments, the radiation travelling in the waveguide is interacting via evanescent wave interaction with the sample, for characterising the fluid. In yet other embodiments, the waveguide may be decorated with nanostructures, allowing for example to increase plasmonic interaction of the radiation travelling in the waveguide with the sample. One example of a system that may benefit from the detection configuration according to embodiments of the present invention is described by Peyskens et al. in "Enhancement of Raman Scattering Efficiency by a Metallic Nano-antenna on Top of a High Index Contrast Waveguide", CLEO 2013 Technical Digest, CM2F.5

Figure 5A:
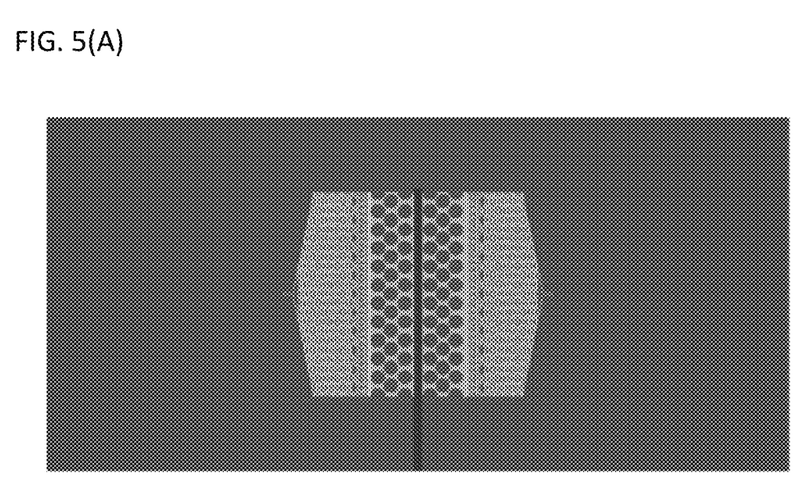
Figure 5B:
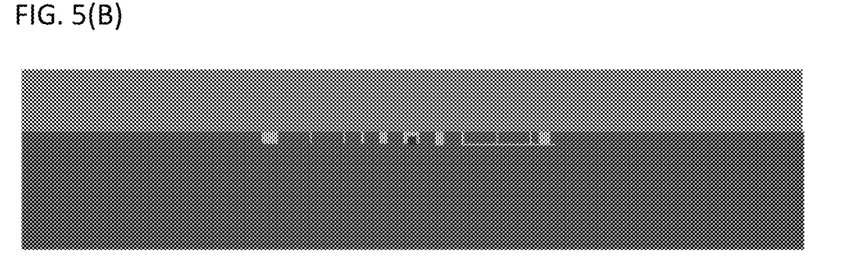

In one particular embodiment, the system may be adapted for performing Raman Spectroscopy on the surface of the waveguide. It is to be noticed that surface-enhanced Raman scattering has been shown to manifest also at longer ranges (up to 30 nm), such that interaction is not strictly limited to occur at the surface. Yet another example of a technique that could benefit from the detection configuration according to embodiments of the present invention is surface plasmon resonance. Alternatively, the system may also be adapted for performing absorption measurements, reflection measurements, transmission measurements, transflective measurements, scattering measurements, diffuse reflectance measurements, etc. The optical measurement technique may be a spectrally resolved measurement technique. An example of a photonics-based system is shown in FIG. 5.

In one aspect, the present invention also relates to a detection system comprising a microfluidic device as described in the first aspect. Such a system may be or may be part of a lab-on-chip system. In the detection system, the radiation source and the detector advantageously are heterogeneously, hybridly or homogeneously integrated in the system. The detection system thus may be an integrated detection system. It is an advantage of an integrated system that it can comprise all necessary components integrated in the system so that the system can be very compact. Alternatively, the detection system may be configured as a cartridge and cartridge holder, whereby the cartridge holder comprises the radiation source and the detector, and wherein the cartridge comprises the microfluidic device.

The detection system typically also may comprise a processor for processing the measured information and for deriving therefrom a quantitative or qualitative property of the sample. The system furthermore may comprise an output means for outputting or displaying the processed information or for outputting or displaying the property of the sample.

The invention claimed is:

1. A microfluidic device for detecting a characteristic of a fluid, the microfluidic device comprising:
a microfluidic channel having at least an inlet for receiving a fluid plug, an outlet configured for removing a fluid plug, and a pillar based flow distributor for reorienting the fluid plug in such a way that the long axis of the fluid plug essentially is oriented perpendicular to walls of the microfluidic channel, as opposed to its original orientation, in which the longer axis is oriented in the longitudinal direction of the narrower inlet channel, the width of the microfluidic channel being larger than the width w of the inlet or the outlet of the microfluidic channel,
wherein the microfluidic device is adapted for detecting with at least one detector a physical or chemical property of the fluid,
the microfluidic device being configured for detecting the physical or chemical property in a detection area positioned across the microfluidic channel in a width direction of the microfluidic channel, and
the microfluidic device being configured for having the detection area positioned within a distance of an exit or an entrance of the pillar based flow distributor that is smaller than the width W of the microfluidic channel,
wherein the microfluidic device is configured for providing an interaction between the sample and a radiation beam for determining an optical property of the sample, and the microfluidic device comprises a collimator and/or radiation guide configured for limiting the radiation in a confined detection region, and
wherein the microfluidic device is configured for detecting the physical or chemical property by measuring in a transverse direction with respect to the average flow direction in the microfluidic channel.

2. The microfluidic device according to claim 1, wherein the width of the microfluidic channel in the detection area is at least 0.2 mm.

3. The microfluidic device according to claim 1, wherein the radiation guide are reflectors or reflecting surfaces configured for redirecting radiation such that it stays in the confined detection region or absorbers or absorbing surfaces configured for reducing radiation to occur outside the confined detection region.

4. The microfluidic device according to claim 1, wherein the system is configured for coupling in radiation from a radiation source and/or configured for coupling out radiation towards a detector using optical fibers.

5. The microfluidic device according to claim 1, wherein the microfluidic device comprises a radiation source and/or an optical detector.

6. The microfluidic device according to claim 1, wherein the microfluidic device comprises a waveguide positioned in the microfluidic channel in a width direction of the microfluidic channel, for inducing interaction of radiation travelling in the waveguide and a sample fluid in the microfluidic channel.

7. The microfluidic device according to claim 6, wherein the waveguide is arranged for inducing evanescent wave interaction with the sample fluid in the microfluidic channel.

8. The microfluidic device according to claim 1, wherein the microfluidic device further comprises an electrical detector configured for detecting any of a resistance, an impedance, a capacitance or a current density.

9. The microfluidic device according to claim 8, wherein the electrical detector comprises at least one working electrode and at least one counter electrode.

10. The microfluidic device according to claim 8,
wherein the height of the microfluidic channel at the position of the electrical detector is smaller than on average in the remaining part of the microfluidic channel.

11. The microfluidic device according to claim 1, wherein the microfluidic device further comprises a chemical detector.

12. A detection system comprising a microfluidic device according to claim 1.

13. The detection system according to claim 12, wherein the system furthermore comprises one or more of an integrated radiation source, an integrated detector, a processor programmed for processing detection data and for deriving thereof a property of the sample fluid and an output configured for outputting a property of the sample fluid.

14. The microfluidic device according to claim 1, wherein the microfluidic device further comprises an electrical detector configured for detecting any of a resistance, an impedance, a capacitance or a current density, and
wherein the microfluidic device further comprises a chemical detector.

15. The microfluidic device according to claim 1, wherein the microfluidic device further comprises a detector configured to detect an absorbance or absorbance spectrum of the sample in the confined detection region.

16. The microfluidic device according to claim 1, wherein the microfluidic device further comprises a detector configured to detect an optical transmission or transmission spectrum of the sample in the confined detection region.

17. The microfluidic device according to claim 1, wherein the microfluidic device further comprises a detector configured to detect an optical density, a reflectance or reflection spectrum, scattering, and or Raman spectra of the sample in the confined detection region.

18. A microfluidic device for detecting a characteristic of a fluid, the microfluidic device comprising:
a microfluidic channel having at least an inlet for receiving a fluid plug, an outlet configured for removing a fluid plug, and a pillar based flow distributor for reorienting the fluid plug in such a way that the long axis of the fluid plug essentially is oriented perpendicular to walls of the microfluidic channel, as opposed to its original orientation, in which the longer axis is oriented in the longitudinal direction of the narrower inlet channel, the width of the microfluidic channel being larger than the width w of the inlet or the outlet of the microfluidic channel, wherein the microfluidic device is adapted for detecting with at least one detector a physical or chemical property of the fluid, the microfluidic device being configured for detecting the physical or chemical property in a detection area positioned across the microfluidic channel in a width direction of the microfluidic channel and for detecting the physical or chemical property by measuring in a transverse direction with respect to the average flow direction in the microfluidic channel, and the microfluidic device being configured for having the detection area positioned within a distance of an exit or an entrance of the pillar based flow distributor that is smaller than the width W of the microfluidic channel, wherein the microfluidic device comprises an electrical detector configured for detecting any of a resistance, an impedance, a capacitance or a current density, and wherein the height of the microfluidic channel at the position of the electrical detector is smaller than on average in the remaining part of the microfluidic channel.

19. The microfluidic device according to claim 18, wherein the electrical detector comprises at least one working electrode and at least one counter electrode.

20. A microfluidic device for detecting a characteristic of a fluid, the microfluidic device comprising:

a microfluidic channel arranged, in terms of a flow, between an inlet for receiving a fluid plug and an outlet for removing a fluid plug, wherein the microfluidic channel includes a pillar-based flow distributor that extends within at least an inlet portion of the microfluidic channel, wherein the pillar-based flow distributor reorients the fluid plug in such a way that a long axis of the fluid plug is caused to be oriented transverse to walls of the microfluidic channel in a main channel of the microfluidic channel, wherein a width W of the microfluidic channel is larger than the width w of the inlet or the outlet and the inlet portion of the microfluidic channel is narrower than the main channel of the microfluidic channel, wherein the microfluidic device is adapted to detect with at least one detector a physical or chemical property of the fluid, the microfluidic device being configured to detect the physical or chemical property in a detection area positioned across the microfluidic channel in a width direction of the microfluidic channel, and wherein the detection area is positioned within a distance D of an exit or an entrance of the pillar-based flow distributor, the distance D being smaller than the width W of the microfluidic channel, wherein the microfluidic device is configured for providing an interaction between the sample and a radiation beam for determining an optical property of the sample and the system comprises a collimator and/or radiation guide configured for limiting the radiation in a confined detection region, and wherein the microfluidic device is configured for detecting the physical or chemical property by measuring in a transverse direction with respect to the average flow direction in the microfluidic channel.

* * * * *